(12) United States Patent
Glimpel et al.

(10) Patent No.: US 11,065,702 B2
(45) Date of Patent: Jul. 20, 2021

(54) METHOD FOR FORMING A THREAD, IN PARTICULAR AN INTERNAL THREAD

(71) Applicant: EMUGE-Werk Richard Glimpel GmbH & Co. KG Fabrik für Präzisionswerkzeuge, Lauf (DE)

(72) Inventors: Helmut Glimpel, Lauf (DE); Dietmar Hechtle, Pegnitz (DE); Thomas Funk, Pegnitz (DE)

(73) Assignee: EMUGE-WERK RICHARD GLIMPEL GMBH & CO. KG FABRIK FUR PRAZISIONSWERKZEUGE, Lauf (DE)

( * ) Notice: Subject to any disclaimer, the term of this patent is extended or adjusted under 35 U.S.C. 154(b) by 0 days.

(21) Appl. No.: 16/961,629

(22) PCT Filed: Jun. 14, 2019

(86) PCT No.: PCT/DE2019/100548
§ 371 (c)(1),
(2) Date: Jul. 10, 2020

(87) PCT Pub. No.: WO2019/238175
PCT Pub. Date: Dec. 19, 2019

(65) Prior Publication Data
US 2020/0338655 A1    Oct. 29, 2020

(30) Foreign Application Priority Data
Jun. 15, 2018   (DE) .......................... 102018114457.1

(51) Int. Cl.
*B23G 5/20* (2006.01)
(52) U.S. Cl.
CPC .......... *B23G 5/20* (2013.01); *B23G 2200/143* (2013.01)

(58) Field of Classification Search
CPC ........................... B23G 5/20; B23G 2200/143
See application file for complete search history.

(56) References Cited

U.S. PATENT DOCUMENTS 6,551,033 B2 *   4/2003   Kakino ................... B23G 1/16
                                                          408/3
9,513,619 B2 *  12/2016   Nishiwaki ............ G05B 19/416
(Continued)

FOREIGN PATENT DOCUMENTS

| DE | 102016008477 A1 | 1/2018 |
|----|-----------------|--------|
| DE | 102016008478 A1 | 1/2018 |
| JP | 2006082199 A    | 3/2006 |

OTHER PUBLICATIONS

International Preliminary Report on Patentability for PCT/DE2019/100548, dated Dec. 15, 2020, 7 pages (English Translation Only).

*Primary Examiner* — Eric A. Gates
(74) *Attorney, Agent, or Firm* — Workman Nydegger

(57) ABSTRACT

A method for forming a thread with a predefined thread pitch and with a predefined thread profile in a workpiece, in which a tool is used, wherein, during working movement, a thread generating region forms a thread, wherein the tool is moved during a second working phase further into the workpiece in the same forwards direction as in the working movement, as far as a reversal point, wherein the decelerating movement comprises a rotational movement in the same rotational direction as in the working movement, wherein during the decelerating movement, the axial feed movement is controlled in dependence on the rotational angle of the rotational movement of the tool and wherein the axial feed of the tool during a complete revolution, is smaller in terms of amount than the thread pitchat least during part of the decelerating movement and is zero at the reversal point.

13 Claims, 11 Drawing Sheets

(56) References Cited

U.S. PATENT DOCUMENTS

| | | | |
|---|---|---|---|
| 10,421,139 B2* | 9/2019 | Kopton | B23G 5/20 |
| 10,596,647 B2* | 3/2020 | Kopton | B23D 13/00 |
| 10,625,355 B2* | 4/2020 | Watanabe | B23G 1/02 |
| 10,632,553 B2* | 4/2020 | Kopton | B23G 5/20 |
| 2016/0357171 A1* | 12/2016 | Morita | G05B 19/4141 |
| 2017/0028490 A1* | 2/2017 | Morita | G05B 19/4141 |

* cited by examiner

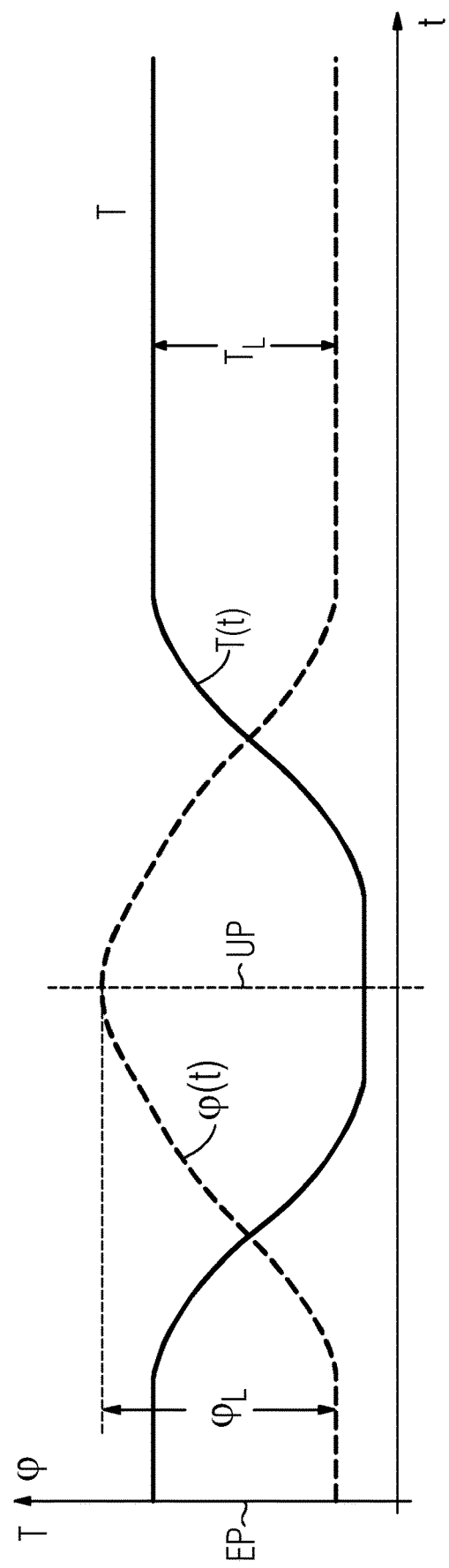

METHOD FOR FORMING A THREAD, IN PARTICULAR AN INTERNAL THREAD

CROSS-REFERENCE TO RELATED APPLICATIONS

The present invention is a 35 U.S.C. § 371 U.S. National Stage of PCT Application No. PCT/DE2019/100548, filed on Jun. 14, 2019, which claims priority to German Patent Application No. 10 2018 114 457.1, filed Jun. 15, 2018. The entire content of each of the aforementioned patent applications is incorporated herein by reference.

BACKGROUND OF THE INVENTION

1. Field of the Invention

The invention relates to a method for forming a thread, in particular an internal thread.

2. The Relevant Technology

A thread has a helical flight with a constant thread pitch and can be formed as an internal thread or as an external thread. For forming an internal thread, a core hole (or: core drill hole) is generally first produced in the workpiece, which core hole can be a blind hole or also a through-hole, and the flight is then produced in the inner wall of the core hole. The core hole with the thread is also referred to as a threaded hole.

Both cutting and non-cutting methods and threading tools are known for forming threads or finishing threads. Cutting thread forming is based on the removal of the material of the workpiece in the region of the flight. Non-cutting thread forming is based on forming of the workpiece and production of the flight in the workpiece by pressure. An overview of thread forming tools and working methods which are in use is given in Handbuch der Gewindetechnik and Frastechnik, issuer: EMUGE-FRANKEN, publisher: Publicis Corporate Publishing, year of publication: 2004 (ISBN 3-89578-232-7), referred to hereinbelow simply as "EMUGE manual".

Cutting thread forming includes taps (see EMUGE manual, chapter 8, pages 181 to 298) and milling cutters (see EMUGE manual, chapter 10, pages 325 to 372) and, for external threads only, dies (see EMUGE manual, chapter 11, pages 373 to 404).

A tap is a thread cutting tool whose cutters or thread cutting teeth are arranged along an external thread at the thread pitch of the thread to be formed. On forming the thread, the tap is moved into a cylindrical core hole in a workpiece with axial feed relative to the tool axis and with rotation about its tool axis, with a rotational speed which is dependent on the axial feed rate corresponding to the thread pitch, whereby the tool axis of the tap is oriented coaxially with the center axis of the core hole and its cutters are permanently in engagement with the workpiece at the core hole wall (continuous cut), so that a continuous flight is produced at the core hole wall. Typical geometries of a tap with the conventional initial cutting region are described in the EMUGE manual, chapter 8, pages 250 and 251 and 284 and 285. The thread cutting teeth have a cutting profile or active profile in the cutting direction, in cross-section perpendicular to the helix, at the outer edge, and, inwardly adjoining that profile, a cutting face and, on the adjoining tooth back opposite the cutting direction, relieved surfaces or relief angles, so that no contact and thus no friction with the workpiece occurs there. A typical distribution of the individual thread active profiles of the thread cutting teeth angularly ground in the initial cutting region with the corresponding cutting plan is shown in the EMUGE manual, chapter 9, page 322.

The thread cutting operation with a tap is explained, together with a typical torque curve, in the EMUGE manual, chapter 8, page 255. After the cutting process of the tap until engagement of all initial cutting teeth, the machine spindle is decelerated to a standstill. The return or the reversing movement is then started, and the tooth back of the thread cutting tooth that is at the front in the thread cutting operation shears the chip that is still in the drilled hole at its free rear side and squeezes the chip root back between the relieved surface and the hole wall.

The non-cutting thread forming tools include so-called cold-forming taps (see EMUGE manual, chapter 9, pages 299 to 324) and, for external threads only, thread rolling tools (see EMUGE manual, chapter 11, pages 373 to 404).

Cold-forming taps are threading tools having a thread profile which runs approximately spirally or helically, along which there are arranged multiple pressing lugs (also referred to as forming teeth, furrowing teeth or forming wedges) which are formed by mutually offset polygonal corner regions of an approximately polygonal cross-section of the cold-forming tap which project further outwards and are generally rounded. On forming the thread, the cold-forming tap, similarly to the tap, is moved into a cylindrical core hole in a workpiece with axial feed relative to the tool axis and with rotation about its tool axis, whereby the tool axis of the tap is oriented coaxially with the center axis of the core hole. The rotational speed and the axial feed rate are matched to one another according to the thread pitch. The pressing lugs of the cold-forming tap are permanently in engagement with the workpiece at the core hole wall and press the flight into the core hole wall by plastic deformation, so that a continuous flight is produced at the core hole wall. Typical geometries of a cold-forming tap with the conventional initial furrowing region are described in the EMUGE manual, chapter 9, pages 308 and 309. A typical distribution of the individual thread active profiles of the thread furrowing teeth rising in the initial furrowing region is shown in the EMUGE manual, chapter 9, page 322. The thread furrowing operation with a cold-forming tap is explained together with a typical torque curve in the EMUGE manual, chapter 9, page 310.

Taps and cold-forming taps work with an exclusively axial advance or working movement, with a rotational movement about their own tool axis which is synchronized according to the thread pitch. The rotational direction of taps and cold-forming taps when forming the thread corresponds to the thread direction of the thread to be formed. When the flight has been produced, or at the end of production of the flight, the tool is decelerated and brought to a standstill at a reversal point. Decelerating before the reversal point is reached is normally effected by a reduction, synchronized according to the constant thread pitch, of the axial feed rate and the rotational speed to in each case a value of 0. A backwards or reversing movement is then initiated in order to withdraw the tool from the workpiece, during which the axial feed direction and the rotational direction are exactly opposite to the working movement and the axial feed movement and the rotational movement are again synchronized according to the thread pitch so as not to damage the thread.

Basic principles for the program structure for CNC machines in respect of thread forming are given in the EMUGE manual, chapter 8, page 281, and chapter 10, pages 357 to 359.

Drilling of the core hole is described in the EMUGE manual, chapter 7, pages 161 to 179.

There are further known combination tools in various forms, with which, using the same tool, a threaded hole is formed in the solid material of the workpiece in one working step, that is to say without previously drilling a core hole. These include the drill/thread mills (BGF), which work only in a cutting manner (see EMUGE manual, chapter 10, page 354) and the so-called circular drill/thread mill (ZBGF) (see EMUGE manual, chapter 10, page 355).

Different combinations of the drilling region and the thread generating region in one combination tool for forming a threaded hole are also known from DE 10 2005 022 503 A1, inter alia also the combination of an axially working drilling region and an axial working thread furrowing region in one tool.

From DE 10 2016 008 478 A1 there is known a further combination tool with which, in one working step, a threaded hole is formed in a workpiece solely by an axial working movement. With this combination tool, which is referred to as a percussion tapping tool bit, drilling of the core hole and cutting of the internal thread are carried out in a joint tool bit stroke. The percussion tapping tool bit has at its drill bit tip a main cutting lip and a thread profile which trails in a tapping direction and has at least one thread cutting tooth.

In this known method, a tapping stroke takes place and subsequently a reversing stroke in the opposite direction. In the tapping stroke, on the one hand the main cutting lip produces the core hole and on the other hand the thread profile forms the internal thread at the inner wall of the core hole until a usable intended thread depth is reached. The tapping stroke is carried out with a tapping feed and at a tapping speed, synchronized therewith, of the tapping tool bit. In a following reversing stroke in the opposite direction, the tapping tool bit is guided out of the threaded bore in a reversing direction, specifically with an opposite reversing feed and at a reversing speed synchronized therewith. In this way, it is ensured that the thread profile of the tapping tool bit is moved in the flight of the internal thread in a stress-free manner.

In a variant referred to as prior art in DE 10 2016 008 478 A1, the tapping process is slowed at the end of the tapping stroke, that is to say the tapping feed and the tapping speed synchronized therewith (according to the constant thread pitch) are reduced to 0. However, in the prior art, this retardation of the thread cutting process to a tapping speed of zero has led to an excessively large cutting stress on the thread profile, which can lead to cutting teeth being broken out or the tool bit being broken.

In order to reduce the tool stress, it is instead proposed in DE 10 2016 008 478 A1 that the reversing stroke does not take place immediately after the tapping stroke but rather a groove forming step or groove forming stroke takes place beforehand, in which a pitch-free encircling groove adjoining the internal thread is formed, in which the thread profile of the tapping tool bit can rotate in a stress-free manner. The tapping tool bit is moved beyond the intended thread depth for the tapping stroke until it reaches an intended bore depth, specifically with a groove forming feed as well as at a groove forming speed that are not synchronized with each other and are different from the tapping feed and from the tapping speed. In this manner, the tapping speed can be reduced to 0 without an excessively large cutting lip stress leading to the tool bit being broken or the thread profile breaking out. The encircling groove is produced during the groove-forming stroke with the aid of the main cutting lip as well as of the thread cutting tooth (or general thread tooth) of the thread profile at the tapping tool bit. When the intended bore depth is reached, the groove forming feed is reduced to 0. At the same time, the groove forming speed is also reduced to 0 in order to make possible the reversal in the direction of rotation that is required for the reversing stroke.

At the start of the reversing stroke, the known tapping tool bit is controlled in such a way that the thread cutting tooth can be driven in a stress-free manner into the flight outlet, which opens into the encircling groove. How this is to take place is, however, not disclosed in DE 10 2016 008 478 A1.

Subsequently, the tapping tool bit is guided out of the threaded bore in a reversing direction that is opposite to the tapping direction, specifically with a reversing feed as well as at a reversing speed synchronized therewith, as a result of which the thread cutting tooth can be rotated out of the threaded bore without removal of material.

While the tapping stroke, the groove forming stroke, and the reversing stroke are being carried out, the longitudinal axis of the core hole and the rotational axis of the tapping tool bit remain aligned at all times coaxially with each other.

The tapping tool bit according to DE 10 2016 008 478 A1 has a clamping shank and a tapping body adjoining it, along the longitudinal axis of which there extends at least one chip groove to a front-end main cutting lip at the drill bit tip. At the front-end main cutting lip, a chip surface, which bounds the chip groove, and a front-end free surface of the drill bit tip converge. As viewed in the peripheral direction of the tool bit, the chip groove can be bounded by at least one drill bit web. The chip surface of the chip groove can transition, with formation of an auxiliary cutting lip, into a back surface of the drill bit web on the outer peripheral side.

At the back surface of the drill bit web on the outer peripheral side, the thread profile can be formed with at least one thread cutting tooth. The tooth height of the thread cutting tooth is dimensioned in the radial direction in such a way that the cutting tooth protrudes outwards over the main cutting lip in the radial direction by a radial offset. If need be, the cutting tooth can flushly extend the main cutting lip outwards in the radial direction. Alternatively and/or additionally, as viewed in the axial direction, the cutting tooth can be arranged at an axial offset behind the main cutting lip.

In a preferred embodiment variant, the thread tapping tool bit according to DE 10 2016 008 478 A1 can have three drill bit webs. Each of these drill bit webs is formed with at least one thread cutting tooth. A pre-cutting tooth, a middle cutting tooth, and a finishing cutting tooth of different cutting geometry can be formed on the drill bit in succession in the peripheral direction of the drill bit. The cutting teeth are formed at the thread tapping tool bit in an offset manner with respect to each other in the axial direction. The extents of offset thereof are matched to the tapping speed and to the tapping feed in such a way that flawless thread cutting is ensured.

The invention is based firstly on the surprising finding that, in the known method and tool bit according to DE 10 2016 008 478 A1, axial forces nevertheless occur on the thread cutting teeth during decelerating of the tool bit in the groove forming stroke, which forces lead to stress on the tool bit and corresponding shortening of its useful life.

The object underlying the invention is to provide a method for forming a thread, in particular an internal thread, wherein the internal thread can be formed together with a threaded hole in the solid material or in an already formed core hole in a workpiece.

In particular, in the known method according to DE 10 2016 008 478 A1, the stress on the tool as a result of axial forces during the groove forming step, in which the encircling groove is formed, is to be reduced further.

BRIEF SUMMARY OF THE INVENTION

Embodiments and subject-matter according to the invention suitable for achieving this object are described in particular in the patent claims, which are directed to a method for forming a thread, in particular an internal thread, in particular having the features of independent patent claim 1.

Further embodiments and further developments according to the invention follow in each case from the dependent patent claims.

The feature combinations and subject-matter according to the invention which can be claimed are not limited to the chosen wording and the chosen dependencies of the claims. Instead, any feature of a claim category, for example of a method, can also be claimed in another claim category, for example a tool. Furthermore, any feature in the patent claims, also independently of their dependencies, can be claimed in any desired combination with one or more other feature(s) in the patent claims. Moreover, any feature that is described or disclosed in the description or drawing can be claimed, separately, independently of or in isolation from the context in which it stands, on its own or in any combination with one or more other features which is or are claimed or disclosed in the patent claims or in the description or drawing.

The method is provided for forming a thread with a predefined thread pitch and a predefined thread profile in a workpiece, in which a tool is used, which is rotatable about a tool axis extending through the tool and is movable axially relative to the tool axis and which comprises a thread generating region, wherein the thread generating region has at least one thread tooth, which is adapted and arranged to the predefined thread pitch and comprises an active profile, which corresponds to the thread profile of the thread, and wherein the tool is moved in a working movement into the workpiece or to the workpiece in a working direction during a first working phase, wherein the working movement comprises a rotational movement in a predefined rotational direction about the tool axis and, synchronized with the rotational movement according to the thread pitch, an axial feed movement in an axial forwards direction axially relative to the tool axis, in such a manner that a complete revolution of the tool about the tool axis corresponds to an axial feed of the tool by the predefined thread pitch, wherein, during the working movement, the thread generating region forms the thread, wherein the tool, in a decelerating movement following the working movement, is moved during a second working phase further into the workpiece in the same forwards direction as in the working movement, as far as a reversal point, wherein the decelerating movement comprises a rotational movement with the same rotational direction as in the working movement, wherein during the decelerating movement, the axial feed movement is controlled in dependence on the rotational angle of the rotational movement of the tool according to a previously stored definite relationship, in particular a function or a sequence of functions, between the axial feed of the tool and the rotational angle and wherein the axial feed of the tool during a complete revolution, is smaller in terms of amount than the thread pitch at least during part of the decelerating movement and is zero at the reversal point.

During the decelerating movement in the second working phase, a circumferential or peripheral groove or an undercut is generally produced in the workpiece, for which reason the operation in the second working phase, as well as being referred to as a decelerating operation or movement, can also be referred to as peripheral groove production or circumferential groove production or undercut movement, in the case of a purely cutting tool thus also as a cutaway movement.

The decelerating operation or the second working phase generally begins at an axial feed which corresponds to the thread pitch of the first working phase. The decelerating operation is to be understood as decelerating from the initial thread pitch to zero at the end or at a reversal point and does not have to involve, over the entire rotational angle interval, a reduction of the axial feed in dependence on the rotational angle (deceleration; negative acceleration), in particular to values below the thread pitch. Instead, rotational angle intervals are also possible in which the axial feed, based on the rotational angle, is zero or even temporarily negative, that is to say reverses its direction.

A function which defines the relationship between the axial feed (or: axial penetration depth) and the rotational angle can have a continuous definition range and value range or also a discrete definition range and value range with discrete, previously stored or previously determined value pairs or value tables.

In one embodiment, the rotational speed of the rotational movement at the reversal point is also zero.

In one embodiment, the overall or cumulative axial feed of the tool during the decelerating movement is chosen or set to be between 0.1 times and 2 times the thread pitch.

In a preferred embodiment, during the decelerating movement, mutually different relationships, in particular functions, between the axial feed of the tool and the rotational angle are chosen or set in multiple successive decelerating steps.

In a particularly advantageous embodiment, during multiple, in particular also all, decelerating steps, the axial penetration depth or the axial feed is a linear function of the rotational angle and/or the pitch, that is to say the derivative of the axial penetration depth or of the axial feed with respect to the rotational angle, is constant in each of those decelerating steps and decreases in terms of amount from one decelerating step to a following decelerating step.

This embodiment can be implemented particularly simply by using for the working movement an NC control system for a threading process, for example a G33 path condition, with the thread pitch of the thread and likewise using in the multiple decelerating steps an NC control system, preferably the same NC control system, for a threading process, for example a G33 path condition, with the respective constant pitch as the thread pitch parameter.

In one embodiment, during multiple, in particular all, decelerating steps, the axial penetration depth or the axial feed is a spline function, in particular a cubic spline function, of the rotational angle.

In one embodiment, the different functions of successive decelerating steps are continuously juxtaposed and, in the case of differentiable functions, preferably continuously differentiably juxtaposed.

In one embodiment, in particular during an equalization step, the axial feed during the decelerating movement is zero in a rotational angle sub-interval and/or takes place in the backwards direction contrary to the forwards direction of the working movement in a rotational angle sub-interval.

In one embodiment, after the reversal point has been reached, a reversing movement of the tool is initiated, with which the tool is moved out of the workpiece, wherein the reversing movement comprises first a first reversing phase, with which the thread generating region of the tool is guided back into the flight of the formed thread, and, thereafter, a second reversing phase, during which the thread generating region is guided outwards out of the workpiece through the flight.

In an advantageous embodiment, the reversing movement in the first reversing phase is controlled by the previously stored definite relationship, which is the same in terms of amount but inverted in the rotational direction and feed direction, in particular a function or a sequence of functions, between the axial feed of the tool and the rotational angle, as in the decelerating movement during the second working phase, optionally with omission or shortening of the equalization step, where present.

In one embodiment, a combined tool is now used which is rotatable about a tool axis running through the tool and movable axially to the tool axis and which has a drilling region at a front or free end and a thread generating region which is arranged axially offset to the tool axis relative to the drilling region and protrudes radially further outwards relative to the tool axis than does the drilling region. Now, during the working movement, the drilling region of the tool produces a core hole in the workpiece and the thread generating region produces a flight under the predefined thread pitch in the surface of this core hole.

BRIEF DESCRIPTION OF THE DRAWINGS

The invention will be explained further hereinbelow by means of exemplary embodiments. Reference will thereby also be made to the drawings, in which there are shown, in each case schematically.

Mutually corresponding parts and parameters are provided with the same reference signs in FIGS. 1 to 11.

DETAILED DESCRIPTION OF THE PREFERRED EMBODIMENTS

First exemplary embodiments of the tool and method according to the invention are explained hereinbelow with reference to FIG. 1 and FIG. 2.

Figure 1:
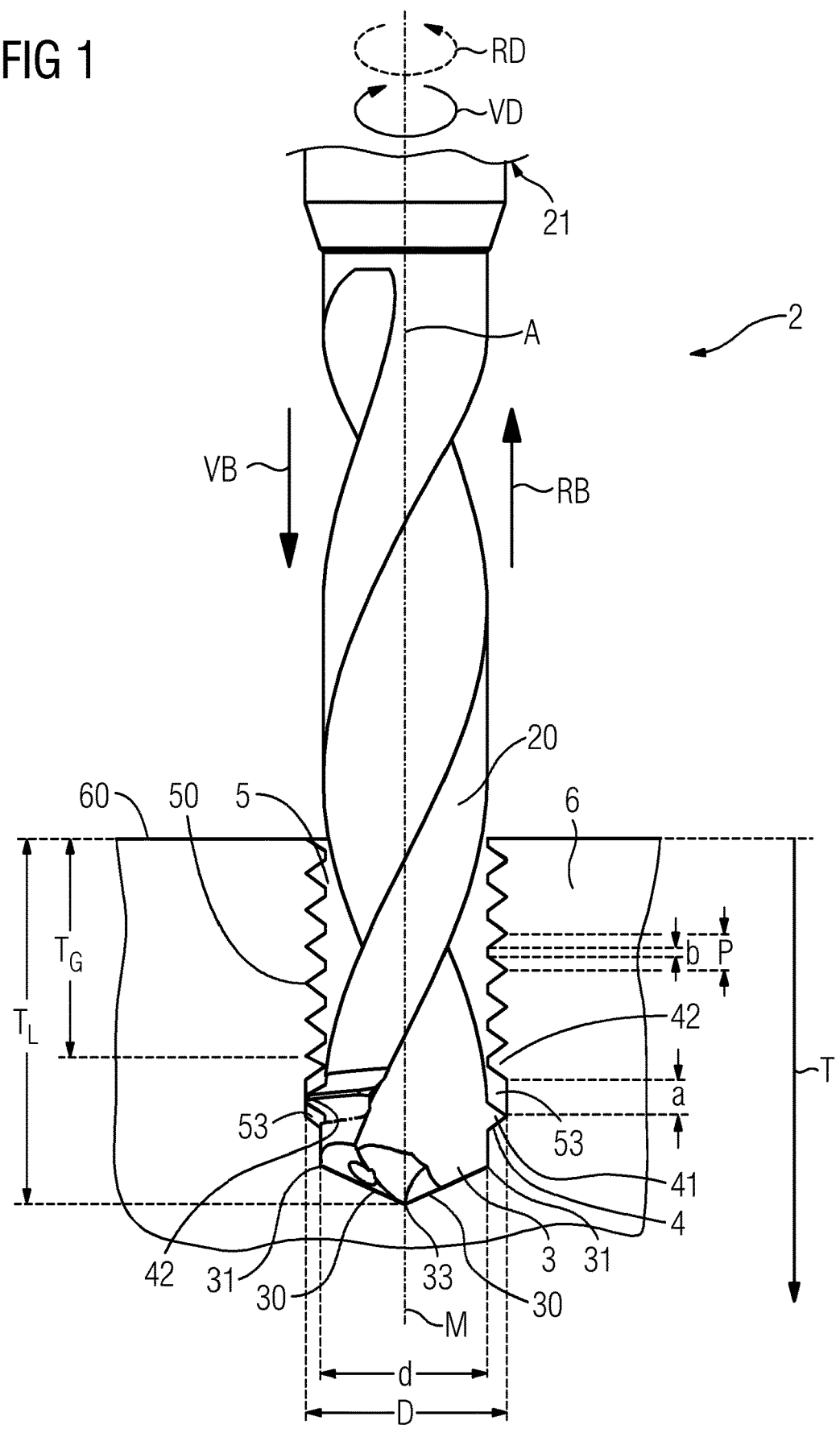
FIG. 1 a combined drilling and thread forming tool in the production of a threaded hole, FIG. 2 a threaded hole produced by the method or the tool according to FIG. 1, in a longitudinal section, FIG. 3 in a diagram, the graph of the axial penetration depth as a function of the rotational angle for a complete threaded hole production cycle, FIG. 4 the end portion of the graph shown in FIG. 3 in the forwards movement as decelerating operation and FIG. 5 the end portion of the graph shown in FIG. 3 in the backwards movement as acceleration operation, FIG. 6 an equalization step in a first form, FIG. 7 an equalization step in a second form, FIG. 8 three exemplary embodiments of control curves, FIG. 9 three further exemplary embodiments of control curves, FIG. 10 two further exemplary embodiments of control curves, and FIG. 11 an exemplary embodiment of the dependence of the rotational angle and the penetration depth on time.

The tool 2 shown in FIG. 1 is used to produce a threaded hole 5 in a workpiece 6. The tool 2 is a combined tool and produces both the core hole in the workpiece with the predefined core hole diameter of the thread and the internal thread in the core hole, that is to say the flight 50 of the internal thread in the lateral wall or inner wall of the core hole. For this purpose, the tool is moved into the workpiece 6 in a working movement or a working stroke or a thread forming movement, which is composed of a rotational movement about the tool axis on the one hand and an axial feed movement along the tool axis.

Figure 2:
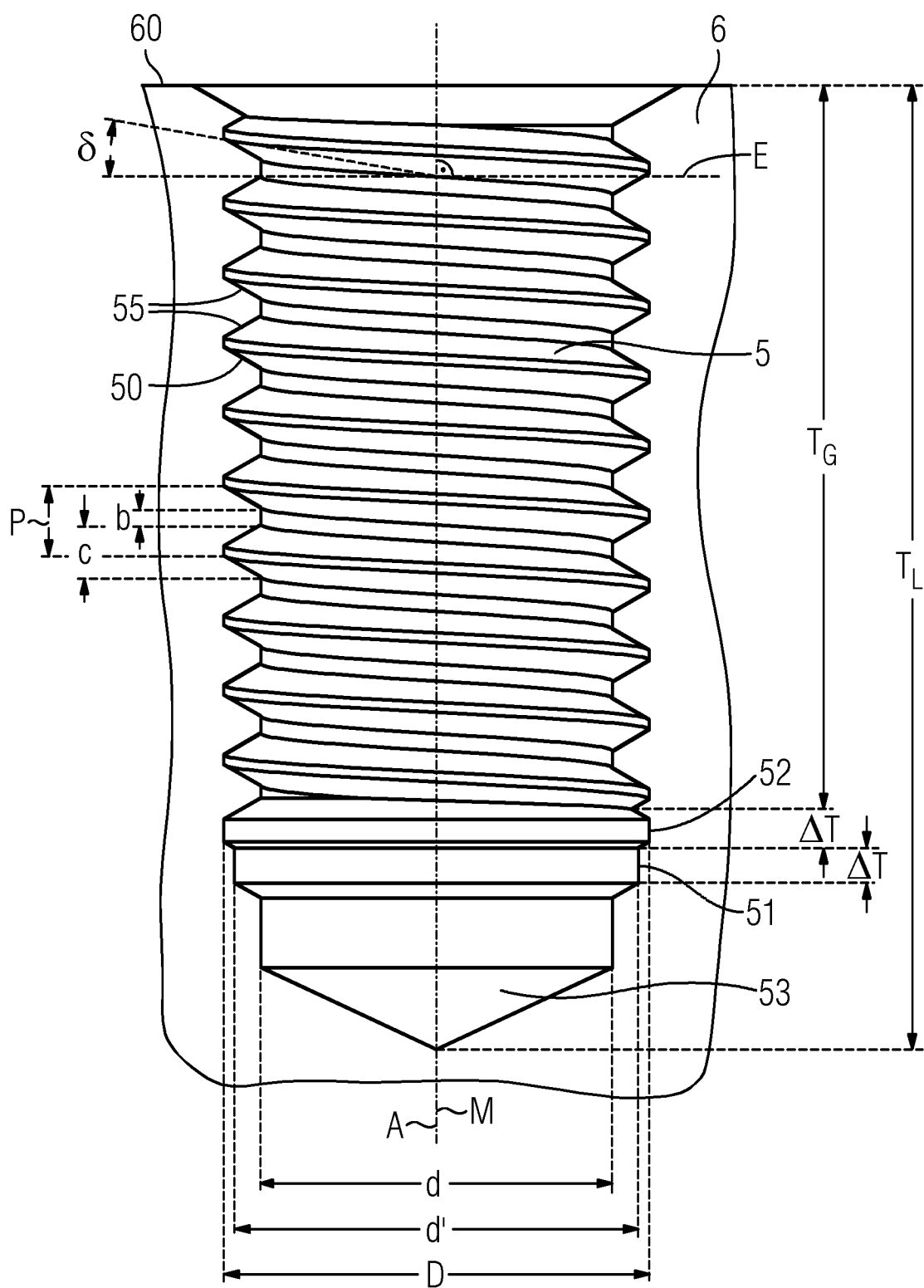

FIG. 2 shows an exemplary embodiment of a threaded hole 5 with a flight 50 and a thread profile 55 which can be produced by a method or a tool according to the invention, for example a tool according to FIG. 1.

The thread pitch angle δ of the flight 50 with thread pitch P and diameter D is measured relative to a transverse plane E, which is oriented perpendicularly to the tool axis A, and can be calculated from the following relationship:

$$P = \pi \cdot D \tan \delta$$

The tool 2 is, as shown, for example, in FIG. 1, on the one hand movable in rotation or rotationally movable about a tool axis A extending through the tool 2 and on the other hand movable axially or in translation along or axially relative to the tool axis A. These two movements are matched or synchronized with one another, preferably by a control unit, in particular machine controller, while the tool 2 penetrates the workpiece 6 at a surface 60 of the workpiece 6 and as far as a hole depth LT. The tool axis A remains stationary or in a fixed position relative to the workpiece 6 while the threaded hole 5 is being produced. The thread center axis M of the threaded hole 5 is coaxial with the tool axis A or coincides therewith during the process.

The tool 2 can preferably be driven in rotation or in a rotational movement about its tool axis A in a forwards rotational direction VD and in an opposite backwards rotational direction RD by means of a coupling region to a tool shank which extends or is formed axially relative to the tool axis A, by means of a rotary drive, not shown, in particular a machine tool and/or a drive or machine tool spindle. Furthermore, the tool 2 is movable axially in an axial forwards movement VB or an axial backwards movement RB axially relative to the tool axis A, in particular by means of an axial drive, which in turn can be provided in the machine tool and/or the drive or machine tool spindle.

At a free end region of the tool 2 remote from the coupling region of the shank 21 there is provided a working region 20. The working region 20 comprises a drilling region 3 at the end-face end of the tool 2 and a thread generating region 4 which is offset axially with respect to the tool axis A to the rear relative to the drilling region 3 or towards the shank 21.

The drilling region 3 comprises end-face (main) drilling cutters 30 which can be arranged to extend axially forwards in a sloping, in particular conical, manner and can taper in a drill tip 33, in particular in a cone which tapers to the drill tip 33. These end-face drilling cutters 30 are configured to cut in the forwards rotational direction VD, with a right-hand cut in the exemplary embodiment shown, and remove material of the workpiece 6 that is located axially in front of the tool 2 in a cutting manner during the forwards movement VB with the simultaneous rotational movement in the forwards rotational direction VD.

In addition, the drilling region 3 preferably also comprises guide regions 31 on its outer wall, which can serve to guide the tool 2 itself in the drilled hole that is produced and for that purpose rest against the core hole wall or are only slightly spaced apart therefrom. Instead of or in addition to the guide regions, peripheral cutters or lateral-surface cutters can be provided, which machine or prepare the lateral wall of the core hole by removing in a cutting manner regions of the workpiece 6 which adjoin radially outwards relative to the tool axis A. These lateral-surface cutters can serve to achieve a sufficient surface quality also of the lateral wall or core hole inner wall and extend in particular predominantly parallel or inclined slightly to the rear (in order to reduce friction) relative to the tool axis A at a radial distance d/2 from the tool axis A which corresponds to half the core hole inside the diameter. The guide regions 31 or peripheral or lateral-surface cutters can be formed and/or arranged directly adjoining the end-face drilling cutters 30 or can also be slightly axially offset relative thereto.

The drilling region 3 thus has an outside diameter or drilling diameter d and consequently produces a bore or a core hole with that inside diameter d in the workpiece 6. The drilling cutters 30 and 31 can also be referred to as core hole cutters, since they produce the core hole of the threaded hole 5. The outermost dimension radial to the tool axis A of the drilling or core hole cutters 30 and 31 thereby determines the core hole inside diameter d.

Behind the drilling region 3 or the drilling or core hole cutters 30 and 31 or arranged axially offset in the opposite direction to the axial forwards movement VB, the tool 2 comprises a thread generating region, with one or more, that is to say a number n greater than or equal to 1, of thread forming teeth or thread forming webs.

When there are multiple (n>1), of thread forming teeth or thread forming webs, these are arranged at least approximately along a helical or screw like line, which corresponds to the thread pitch P of the thread or the flight 50, in an offset manner with respect to each other in the axial direction. Such an arrangement along a helical or screw like line or flight also includes embodiments in which thread teeth are slightly offset laterally with respect to an ideal line, for example in order to produce thread active profiles with different processing at the thread flanks or a different division or superposition of the thread active profiles on the flight or to form the overall thread profile. In respect of this arrangement of the thread teeth, it is important only that their arrangement is reproduced during the working movement on a flight in the workpiece with the same thread pitch P.

In the exemplary embodiment shown, two or more thread forming teeth 41 and 42 are provided, which are axially offset relative to one another, for example, by half a thread pitch P, that is to say are offset in the angle direction according to half a revolution or by 180°. The thread forming teeth, in particular 41 and 42, protrude radially further outwards from the tool axis A than do the drilling or core hole cutters 30 and 31. The outside diameter of the thread generating region 4 and of the flight 50, and thus of the threaded hole 5, is denoted D. The radial difference between the outermost dimension of the thread forming teeth and the outermost radial dimension of the core hole cutters corresponds in particular to the profile depth of the thread profile of the internal thread to be formed or, in other words, the difference between the radius D/2 of the thread base and the radius of the core hole d/2.

The thread profile of the internal thread, that is to say the longitudinal section through the flight 50 in a cutting plane containing the tool axis A, is produced by the thread active profile composed of or superposed from the individual active profiles of the thread forming teeth, for example 41 and 42, in the case of a complete passage through the workpiece.

The thread profile width, measured in axial projection onto the tool axis A, of the thread active profile is denoted c and corresponds to the maximum distance of the thread profile flanks. The axial distance, measured in axial projection onto the tool axis A, between two successive thread profiles of the flight 50 is the thread gap b. The sum of the thread gap b and the thread width c here corresponds to the thread pitch P.

During a first working phase or thread forming phase, the core hole is produced with the tool 2 by means of the drilling region 3 and, immediately axially thereafter and at least partially simultaneously, the flight 50 is produced in the core hole wall by means of the thread generating region 4. In this first working phase, the axial feed rate along the tool axis A is so matched and synchronized with the rotational speed for the rotational movement about the tool axis A that, in the case of a complete revolution, the axial feed corresponds to the thread pitch P. The axial penetration depth (or: the axial feed) T, measured in the direction of the tool axis A, from the workpiece surface 60 in this first working phase corresponds to the thread depth $T_G$.

In a second working phase immediately following the first working phase, the tool 2 is then decelerated in a decelerating operation (or: in a decelerating movement) in a rotational angle interval in such a manner that the axial feed V in the case of a rotational angle of 360°, that is to say in the case of a complete revolution, of the tool 2 is less than the thread pitch 2 and decreases to zero. The decelerating operation or the second working phase generally begins at an axial feed, based on a rotational angle of 360°, which corresponds to the thread pitch P of the first working phase, that is to say V=P, and then reduces the axial feed per 360° rotational angle to values below the thread pitch P, that is to say V<P. The decelerating operation is to be understood as being decelerating from the initial thread pitch V=P to zero at the end or at a reversal point, that is to say V=0, and does not have to involve a reduction in the axial feed V in dependence on the rotational angle (deceleration; negative acceleration) over the entire rotational angle interval. Instead, rotational angle intervals are also possible in which the axial feed, based on the rotational angle, is zero or even temporarily negative, that is to say reverses its direction.

In a preferred embodiment, this decelerating operation takes place in defined substeps, as will be explained in greater detail hereinbelow.

This decelerating movement in the second working phase has the result that the thread generating region 4 then produces—in a manner which is actually atypical or functionally foreign—at least one encircling groove or circumferential groove or peripheral groove in the core hole wall. As well as being referred to as a decelerating operation, the operation in the second working phase can therefore also be referred to as peripheral groove production or circumferential groove production or an undercut movement, in the case of a purely cutting tool also as a cutaway movement.

In FIG. 1, the thread forming teeth 41 and 42 are shown with the same outside radius D/2 and preferably the same thread active profile, which already corresponds to the final profile of the flight 50. In the second working phase, the thread forming teeth 41 and 42 of the tool according to FIG. 1 produce a peripheral groove 53 of continuous outside diameter D and axial length a, which is given by the overall axial feed of the decelerating movement in the second working phase as far as the reversal point.

In FIG. 2, on the other hand, two peripheral grooves 51 and 52 are shown, wherein the first peripheral groove 51 has an outside diameter d' lying between the core hole diameter d and the thread outside diameter D and the second peripheral groove 52 has an outside diameter which corresponds to the thread outside diameter D.

Such peripheral grooves 51 and 52 can be produced during the second working phase, for example, with two thread forming teeth 41 and 42 offset by P/2, as shown, for example, in FIG. 1, which are modified as follows: the first thread forming tooth 41 in FIG. 1 can have an outside radius of only d'/2 and thus be an initial cutting or initial furrowing tooth which does not produce the flight 50 to the full profile depth or to the final thread base, while the second thread forming tooth 42 already has the full outside diameter D, that is to say produces the full thread profile depth (full tooth).

The peripheral groove is thus composed of two part-grooves, namely the first peripheral groove 51 of smaller diameter, which is produced by the first thread forming tool 41, and the second peripheral groove 52 formed with the full diameter D, which is produced by the second thread forming tooth 42.

These embodiments are only by way of example. With a different number or distribution, not shown, of thread forming teeth, correspondingly different peripheral grooves are obtained.

If the peripheral groove(s), for example the peripheral grooves 51 and 52 in FIG. 2 or the peripheral groove 53 in FIG. 1, are to be produced continuously or without interruption in the axial direction, the axial feed V in the case of a complete revolution or 360° is reduced in particular by at least b/n relative to P, in order to close or no longer produce the thread gap b, wherein n is the number of thread forming teeth in the thread generating region 4.

It would also be possible to carry out the undercut movement or decelerating movement in such a manner that the outside width on the thread profile, in particular the flanks, are no longer visible in the peripheral groove or disappear and/or the peripheral groove has only a cylindrical shape. The ability to screw through the workpiece thread formed could thus be improved or made possible.

In the exemplary embodiments shown in FIG. 1 and FIG. 2, n=2 with the two thread forming teeth 41 and 42 or peripheral grooves 51 and 52, so that the axial feed V in the decelerating operation is thus preferably set less than P−b/2. The thread active profile of the thread forming teeth, here 41 and 42, then no longer produces a thread during the movement when superposed but produces at least one continuous peripheral groove which has, throughout, the outside diameter which corresponds to that of the associated thread forming tooth on its respective path during the decelerating movement in the second working phase.

The overall depth or hole depth or overall axial dimension of the threaded hole 5 after the second working phase is denoted $T_L$ and corresponds substantially to the sum $T_G$+a of the thread depth $T_G$ as the axial feed from the first working phase and the axial groove length a as the axial feed from the second working phase.

When the overall depth or hole depth $T_L$ of the threaded hole 5 has been reached, the tool 2 comes to a standstill and reaches a reversal point.

At the reversal point, a reversing or backwards movement RB is then immediately initiated, with which the tool 2 in a first reversing phase is first moved back through the peripheral groove(s) 51, 52, 53 to the flight 50 and then, in a second reversing phase, is moved or fed outwards out of the threaded hole 5 and then the workpiece 6 through the thread or the flight 50.

A preferred form of the first reversing phase will be discussed in greater detail hereinbelow.

In the second reversing phase of the backwards movement RB, the axial feed and the rotational movement of the tool 2 are again synchronized with one another according to the thread pitch P, in order not to damage the thread, except that the direction of the axial feed in the arrow direction of the backwards movement RB is changed or opposite relative to the arrow direction of the forwards or working movement VB and the rotational direction of the rotational movement is likewise reversed, that is to say the backwards rotational direction RD is set instead of the forwards rotational direction VD.

The thread axis or center axis of the thread with the flight 50 is denoted M and coincides with the tool axis A of the tool 2 or is coaxial therewith during the entire working movement, that is to say both in the first working phase and in the second working phase, and also during the reversing movement, that is to say both in the first reversing phase and in the second reversing phase.

Figure 3:
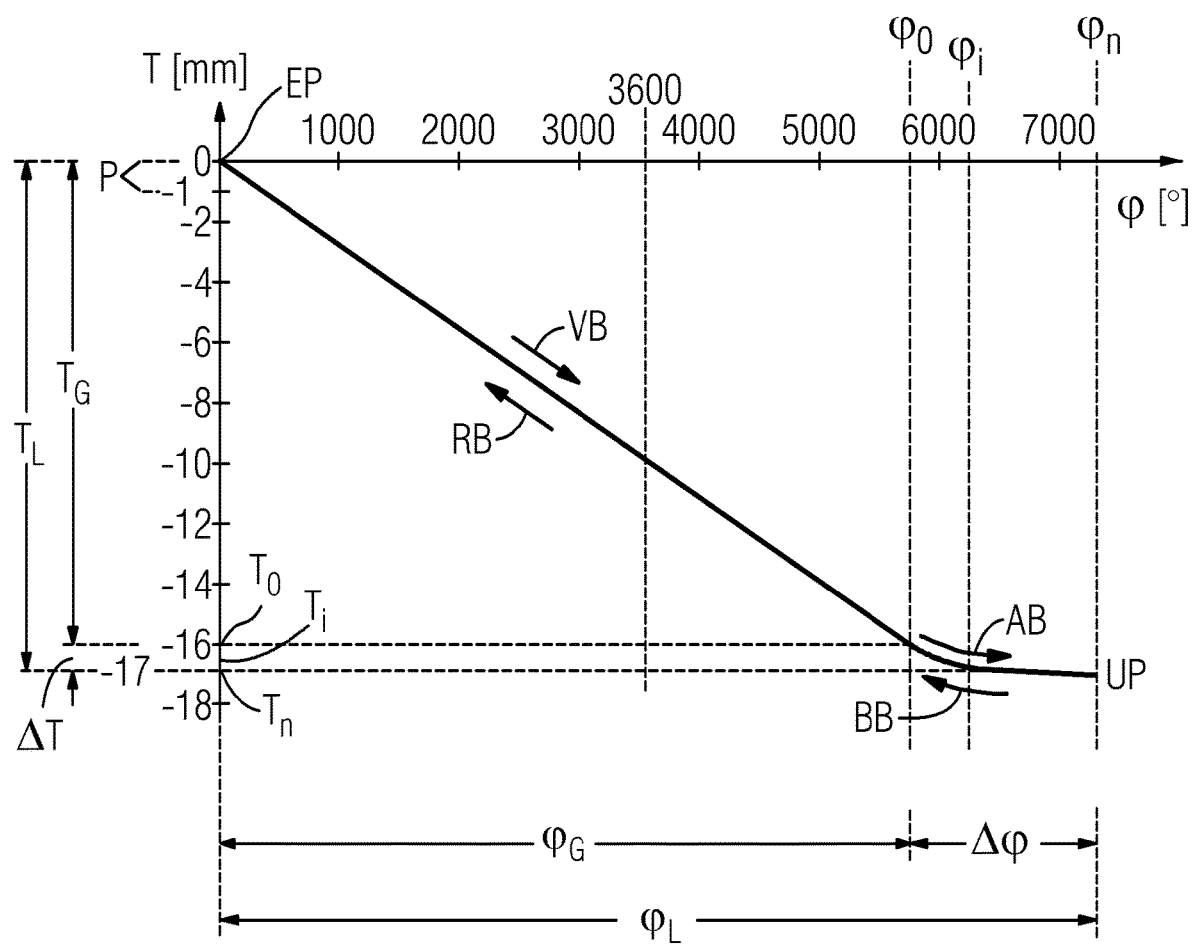
Figure 4:
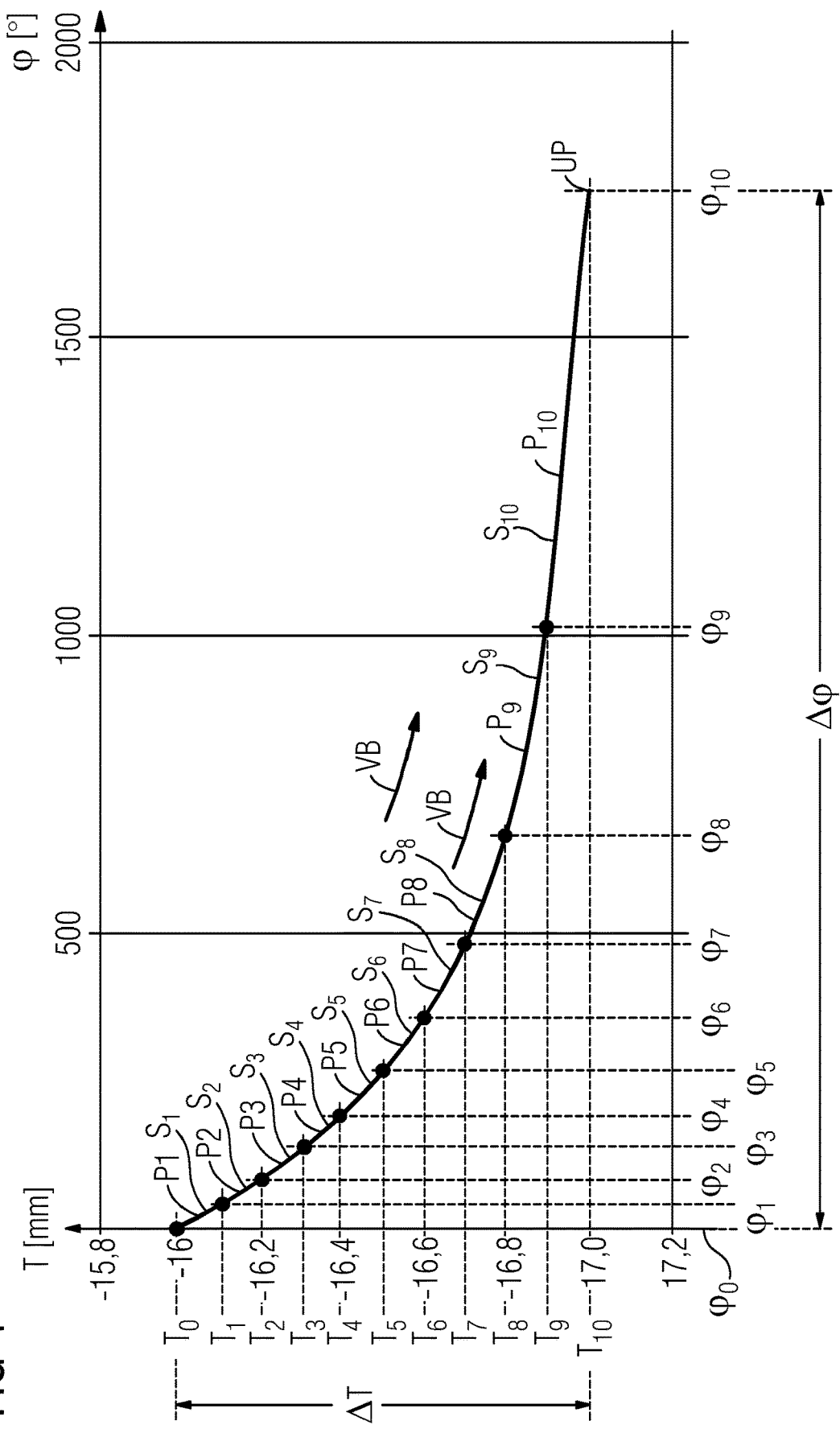
Figure 5:
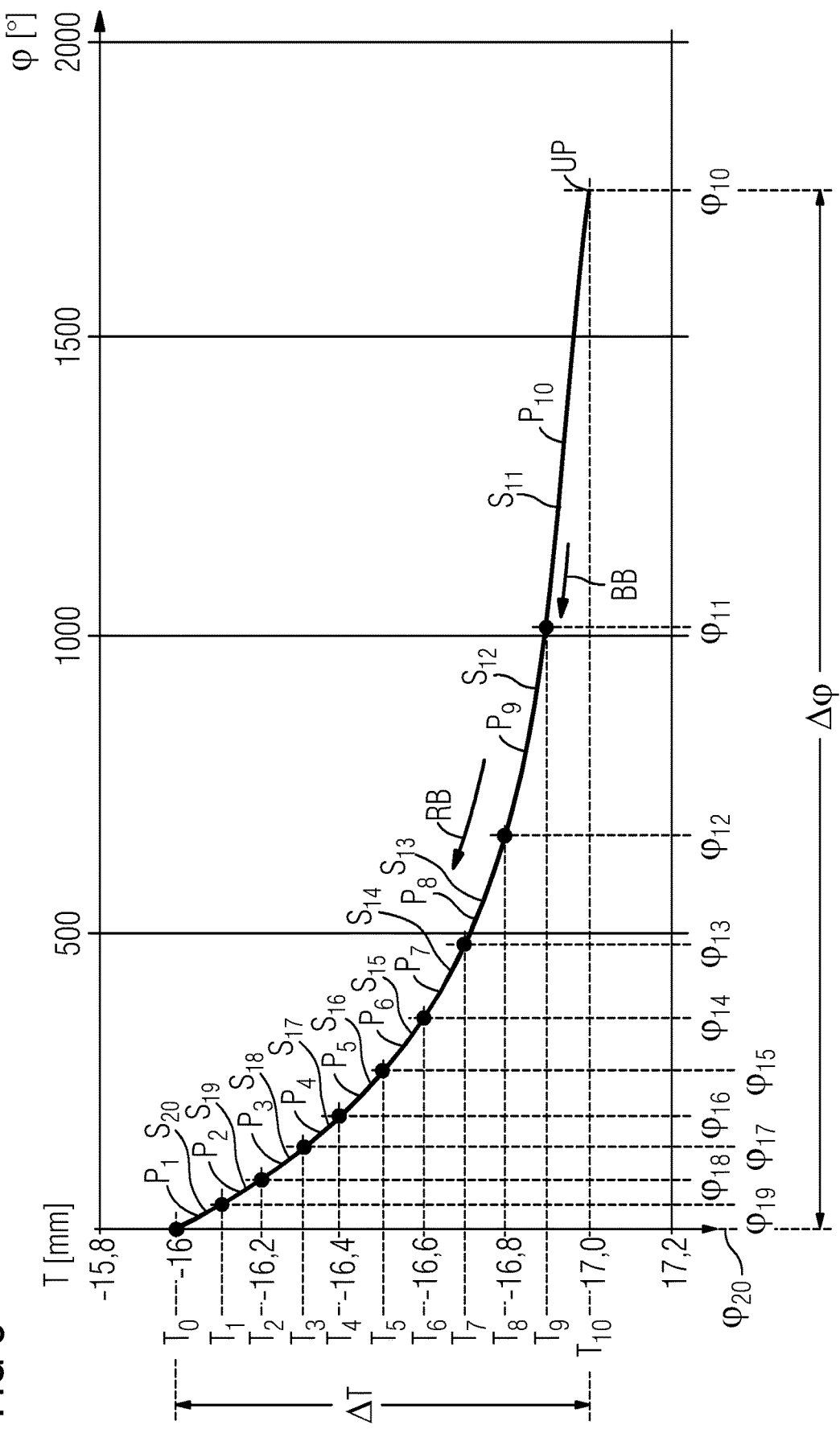

FIGS. 3 to 5 show, in each case by means of a diagram, an exemplary embodiment of a process (or: method) or of a control sequence which can be used both for forming a thread in a previously produced core hole in the workpiece or for producing a threaded hole in the workpiece, that is to say in the solid material of the workpiece without previously drilling a core hole, for example a threaded hole according to FIG. 2.

For forming a thread in a pre-produced core hole, a tap or cold-forming tap according to the prior art mentioned at the beginning can be used.

For producing a threaded hole, a combined drilling and tapping tool, as known from DE 10 2016 008 478 A1 mentioned at the beginning, or a combined drilling and cold-forming tool, as known from DE 10 2005 022 503 A1 mentioned at the beginning, can be used, or a tool according to the invention, for example according to FIG. 1, can also be used.

In the diagram of FIG. 3, the penetration depth (or: vertical or axial coordinate) T is plotted on the vertical axis or ordinate as the coordinate for the axial feed in mm, which extends and is measured in the axial direction, that is to say along the tool axis A and the thread center axis M coaxial with the tool axis A. The values for the penetration depth T decrease from the value T=0 mm shown at the very top, which corresponds in particular to the axial entry position at the workpiece surface 60 of the workpiece 6 (as can be seen in FIG. 1), downwards, that is to say are plotted downwards as negative values. The number range extends in the example of FIG. 1, by way of example, from T=0 mm to T=−18 mm.

On the horizontal axis or abscissa there is plotted the (cumulative) rotational angle φ of the rotational movement of the tool 2 about its tool axis A in degrees [°]. The rotational angle φ starts from the entry rotational angle or initial rotational angle φ=0° at the axial entry position T=0 mm at an entry point EP (0, 0) and increases to the right to positive values up to the value of φ=8000° entered as the last value on the abscissa. The rotational angle φ increases during the forwards rotational movement VD or in a forwards rotational direction to positive values and decreases during the backwards rotational movement RD or a backwards rotational direction contrary to the forwards rotational direction. ±360° thereby corresponds to a complete revolution of the tool 2 about its tool axis A.

The graph of the function T(φ) according to FIG. 3 illustrates, without loss of generality, in particular the production of a threaded hole, that is to say a complete threaded hole production cycle according to the invention in an exemplary embodiment, in particular a threaded hole production cycle with a first working phase, a second working phase, a reversal point, a first reversing phase and a second reversing phase, for example as already described with reference to FIGS. 1 and 2.

The function T(φ) describes the dependence or synchronization of the axial feed movement in the axial coordinate (or: depth in the workpiece 6) T on or with the rotational movement in the coordinate φ and is typically stored in a control system such as a numerical control system or CC control system of the machine tool, in particular in the form of a previously determined and stored value table or also as function for calculation in each case. According to the nomenclature conventional in CNC technology, the T-coordinate corresponds to the Z-axis (spindle axis), wherein the positive direction conventionally extends from the workpiece to the tool, as indicated, for example, in FIG. 1 in the case of coordinate T.

The graph (φ; T(φ)) of the function T(φ), according to FIG. 3, first extends a linear portion typical of a tap or cold-forming tap and corresponding to the production of the flight, that is to say in the form of a straight line, from the starting point φ=0° and T=0 mm to a thread end point at $\varphi_0$ and $T(\varphi_0)$=−16 mm, at which the flight or the actual thread formation ends.

The linear function T(φ) in this portion from φ=0 to φ=$\varphi_0$ and T=0 to T=−16 mm is thus as follows:

$$|T(\varphi)|=(P/360°)\varphi$$

with thread pitch P.

The pitch or derivative dT/dφ in this region is constant and corresponds to the amount according to P/360°. Thus, for the thread pitch $$P=360°|dT/d\varphi|$$

Since in the chosen example of FIG. 3 the value for the thread depth T corresponding to the recorded angle value φ=3600° is T=−10 mm, the pitch of the straight line is −1 mm/360° and thus the thread pitch P=1 mm.

Owing to the axial feed, synchronized with the rotation, along the penetration depth T, or thread center axis M, all components of the tool 2 are migrated further by the thread pitch P on a complete revolution through 360°.

The linear portion of the function T(φ) corresponds to the usual synchronized tap or cold-forming tap kinematics and can be stored in a CNC control system, for example, as an already firmly programmed path condition (letter address G or G function), for example as G33, in particular G331 and G332, wherein the thread pitch P is entered as the interpolation parameter parallel to the Z-axis, typically under the letter address K in CNC nomenclature.

In this linear portion, the thread forming process takes place, in particular for producing the flight 50 in the first working phase according to FIGS. 1 and 2, and a thread of thread depth $T_G$ as the interval length of the penetration depth T, in particular from T=0 to $T_0$, over the interval length or the rotational angle range $\varphi_G$ of the rotational angle φ, in particular from φ=0° to φ=$\varphi_0$, is formed. In the example of FIG. 3, the thread forming process (first working phase) takes place from φ=0° to φ=$\varphi_0$ and from the corresponding penetration depth T=0 mm to T=−16 mm.

The pitch of the straight line in FIG. 3 between φ=0 and φ=$\varphi_0$ corresponds to the axial feed rate of the tool 2, which is synchronized with the rotational angle φ according to the thread pitch P.

The temporal dependence of the rotational angle φ(t) as a function of time t, and thus penetration depth T(t) as a function of time t, can in principle be varied during the thread forming process—also in wide ranges. Preferably, however, the rotational speed dφ/dt and the axial feed rate dT/dt during the working movement VB are each constant. If the rotational speed dφ/dt is changed, the axial feed rate dT/dt, that is to say the derivative of the penetration depth T with respect to time t, must thus also be correspondingly adapted in order that the synchronization of the axial feed Z according to the relationship Z=P/360° is maintained.

These are the kinematics that are known and implemented in machine tool control systems or CNC control systems in the case of thread formation by means of an axially working threading tool such as a tap or cold-forming tap.

Following the thread forming process (first working phase), a decelerating operation or a decelerating movement AB then takes place, in particular in the second working phase, in a rotational angle range Δφ between the rotational angle values $\varphi_0$ and $\varphi_n$ and an associated penetration depth range ΔT, which in the example of FIG. 3 reaches from $T(\varphi_0)$=−16 mm to $T(\varphi_n)$=−17 mm. At the end of the decelerating movement AB, a reversal point UP is reached, at which the tool 2 briefly comes to a standstill both in terms of the rotational movement and in terms of the axial feed movement. At the reversal point UP, the maximum rotational angle range $\varphi_L$ for the production of the threaded hole is reached, wherein $\varphi_L=\varphi_G+\Delta\varphi$, and the maximum penetration depth $T_L$ for the threaded hole, wherein $T_L=T_G+\Delta T$.

During the decelerating operation or the decelerating movement AB, the axial feed rate is reduced in dependence on the rotational angle, which corresponds to the pitch of the graph shown for the function T(φ), according to a dependency or function which is preferably strictly monotonic (pitch always decreasing) or monotonic (pitch decreasing and optionally also zero in some regions), but can optionally also increase again slightly in sub-portions. Preferably, the pitch is successively reduced in a predetermined number n of individual defined programmed or stored sub-steps or decelerating steps $S_i$, wherein the total number or number n is a natural number with n>1, generally 200>n>2, in particular 20>n>5 is chosen, and wherein i is the counting index for the decelerating step $S_i$ and is between 1 and n, that is to say 1≤i≤n.

In each sub-step or decelerating step $S_i$, a synchronization of the axial feed T (or of the feed rate dT/dt) and the rotational angle φ (or the rotational speed dφ/dt) corresponding to the control of a threading process is set or programmed by allocating or programming each decelerating step $S_i$ with 1≤i≤n an associated predetermined function Ti(φ) with an associated value interval $[T_{i-1}, T_i]$ over the associated rotational angle range $[\varphi_{i-1}, \varphi_i]$.

The function $T_i(\varphi)$ is preferably linear, the graph is thus (idealized) a straight line.

The programmed or stored pitch thereby decreases stepwise or in succession from each decelerating step $S_i$ to the next decelerating step $S_{i+1}$, that is to say $|dT_i/d\varphi|>|dT_{i+1}/$ $d\varphi$|. The pitch in each case corresponds to a pitch parameter. In an advantageous embodiment, this pitch parameter is programmed in the CNC control system as the thread pitch, that is to say in particular as the interpolation parameter along the Z-axis or the thread axis M in a G33, in particular G331 or G332, path condition. The path conditions or G functions already defined in the control programming can thus be used, and only the input parameter of the thread pitch must successively be changed or re-programmed.

Accordingly, in each decelerating step $S_i$, the associated pitch parameter $$P_i = |dT_i/d\varphi|$$

is programmed or set, wherein $$P_{i+1} < P_i$$

for all i with 1≤i≤n. Furthermore, $$P_i < P,$$

that is to say the pitch in the second working phase or during the decelerating movement AB is less than the thread pitch P during the first working phase. In particular, but without loss of generality, it is possible that Pi=P(n−i)/n. This is for example true for $P_1$ to $P_{n-1}$, wherein for $P_n$ a value smaller than $P_{n-1}$ is chosen, e.g. $P_{n-1}/2$.

In particular $P_1$ is chosen to be as close to P as possible. Further in particular $P_n > 0$ and is as close to 0 as possible.

The values of $P_i$ can, for example, be so chosen that, from the thread pitch movement, a constantly continued movement into the relief-cutting region is possible. In particular, the speed of the tool is to be retained where possible. Consequently, different conditions can be formulated, for example, which can be reproduced in approximation functions.

In each decelerating step $S_i$, for all i with 1≤i≤n, the following relationship applies:

$$T(\varphi) = T_{i-1} - (P_i/360°)(\varphi - \varphi_{i-1})$$

for $\varphi \in [\varphi_{i-1}, \varphi_i]$ with the boundary conditions $T(\varphi_{i-1}) = T_{i-1}$ and $T(\varphi_i) = T_i$.

The rotational angle range $\Delta\varphi$ for the decelerating movement AB in the second working phase is generally chosen to be smaller than the rotational angle range $\varphi_G$ for the thread formation in the first working phase, in particular $\Delta\varphi < 0.5 \varphi_G$ and preferably $\Delta\varphi < 0.2 \varphi_G$ is chosen. This can depend in particular on how large the usable thread length is. Another influencing factor is the intended function in the undercut. If it is desired, in addition to pure decelerating, to additionally make further rotations in order to cut free the chips, revolutions can again be added (see in connection with FIGS. 6 and 7 hereinbelow).

The penetration depth (or: the maximum penetration depth) $\Delta T$ for the decelerating movement AB in the second working phase is generally chosen to be smaller than the penetration depth range or the thread length $T_G$ for the thread formation in the first working phase, in particular $\Delta T < 0.5 T_G$, preferably $\Delta T < 0.2 T_G$, is chosen.

The penetration depth range $\Delta T$ for the decelerating movement AB can in particular be chosen to be equal to P. Likewise, a penetration depth range $\Delta T$ less than P is possible in order to keep the thread hole depth smaller, for example 0.5 P or also 0.25 P. For reasons of chip removal, it may also be advantageous to choose larger undercut heights or a larger penetration depth range $\Delta T$, in particular up to 2 P and in exceptional cases even larger.

FIG. 4 shows an exemplary embodiment of a decelerating movement AB in an enlarged view of the bottom right region of the diagram of FIG. 3 in a rotational angle range $\Delta\varphi$ and an associated penetration depth range $\Delta T$.

In FIG. 4, by way of example and without loss of generality, n=10 is chosen, and ten decelerating steps $S_1$ to $S_{10}$ with the associated pitch parameters $P_1$ to $P_{10}$ are thus indicated.

The rotational angle range $\Delta\varphi$ is correspondingly divided into the n=10 rotational angle intervals $[\varphi_0, \varphi_1]$, $[\varphi_1, \varphi_2]$, ..., $[\varphi_{i-1}, \varphi_i]$, $[\varphi_i, \varphi_{i+1}]$, ..., $[\varphi_9, \varphi_{10}]$ and associated with those intervals are the corresponding penetration depth intervals $[T_0, T_1]$, $[T_1, T_2]$, ..., $[T_{i-1}, T_i]$, $[T_i, T_{i+1}]$, ..., $[T_9, T_{10}]$, into which the penetration depth range $\Delta T$ is divided, which in the example of FIG. 4 ranges from $T(\varphi_0) = -16$ mm to $T(\varphi_{10}) = -17$ mm and/or corresponds to the thread pitch –P=−1 mm. Each interval corresponds to a sub-step $S_i$.

In FIG. 4, unlike in FIG. 3, the rotational angle difference starting from $\varphi_0$ is recorded. If it is desired to plot the same values on the rotational angle axis for $\varphi$ in FIG. 4 as in FIG. 3, all the values on the horizontal axis are to be added to the value of $\varphi_0$, which in FIG. 3, for example, is 5800°. The decelerating movement AB begins at the rotational angle value $\varphi_0$ and the associated depth penetration value $T_0$ and ends at the final rotational angle value $\varphi_{10}$ and the associated depth penetration value $T_{10}$.

There is then allocated to each of these intervals of each decelerating step $S_i$ an associated pitch parameter $P_i$, in particular as the thread pitch or interpolation parameter of the CNC control system, that is to say the pitch $P_1$ to the two intervals $[\varphi_0, \varphi_1]$ and $[T_0, T_1]$, the pitch $P_2$ to the interval pair $[\varphi_1, \varphi_2]$ and $[T_1, T_2]$ and so on up to pitch $P_{10}$ for the last interval pair $[\varphi_9, \varphi_{10}]$ and $[T_9, T_{10}]$.

The pitch values $P_1$ to $P_{10}$ are so chosen that $P_{i+1} < P_i$ for i=1 to i=10 in FIG. 4 or n in FIG. 3. In each sub-portion or decelerating step $S_i$, the thread pitch $P_1$ to $P_{10}$ remains constant, so that substantially straight sub-portions of the graph of the function $T(\varphi)$ are obtained, in which a synchronized "thread movement" takes place, that is to say the axial feed rate corresponds to the quotient of $P_i/360°$.

In the exemplary embodiment of FIG. 4 shown, the penetration depth intervals in the decelerating steps $S_i$ were chosen to be equal for all i with 1≤i≤n (here, for example, n=10), so that the length of the intervals $T_1 - T_0 = T_2 - T_1 = T_i - T_{i-1} = T_{i+1} - T_i = T_n - T_{n-1}$ is chosen to be equal or equidistant, that is to say $$T_i - T_{i-1} = \Delta T/n$$

in the exemplary embodiment of FIG. 4 shown is chosen as −1 mm/10=−0.1 mm.

Because the axial feed in each sub-step or sub-interval is chosen to be constant in the exemplary embodiment of FIG. 4, since $T_{i+1} - T_i$ is chosen to be the same or equidistant for all i, there are obtained for a decreasing pitch $P_i$ and thus decreasing axial feed rate increasing rotational angle intervals $\varphi_{i+1} - \varphi_i$ $$\varphi_{i+1} - \varphi_i > \varphi_i - \varphi_{i-1}$$

in the rotational angle range $\Delta\varphi$ in the decelerating steps $S_i$. That is to say, the rotational angle distance $\varphi_2 - \varphi_1$ is smaller than the rotational angle distance $\varphi_3 - \varphi_2$ and the rotational angle distance $\varphi_{i+1} - \varphi_i$ is larger than the angle distance $\varphi_i - \varphi_{i-1}$. The last sub-portion between the rotational angle values $\varphi_{10} - \varphi_9$ covers the largest angle distance or angle range. This corresponds to a continuous decelerating operation which is retarded in each sub-portion or decelerating step $S_i$.

During the decelerating movement AB, the temporal dependence of the rotational speed $d\varphi/dt$ and the axial feed rate $dT/dt$ is so chosen or controlled or programmed that the tool 2 comes to rest at the reversal point $UP=(\varphi_n, T_n)$ or $(\varphi_{10}, T_{10})$, that is to say $d\varphi/dt=0$ and $dT/dt=0$ at $\varphi=\varphi_n$ or $T=T_n$ or at $\varphi=\varphi_{10}$ or $T=T_{10}$.

The reduction of the rotational speed $d\varphi/dt$ and of the axial feed rate $dT/dt$ to 0 in dependence on the time t can take place, for example, continuously during the decelerating movement AB or also, for example, only in the last decelerating step $S_n$ or $S_{10}$.

The curves of the graphs in the decelerating steps $S_1$ to $S_{10}$ in FIG. 4, which curves are in reality not exactly linear but are slightly rounded, follow physically from the inertias of the drive system, in particular the control system, including their interpolation routines to smooth the transitions, and the machine drives and the mass inertia of the moved components.

However, represented in an idealized manner or stored in the programming of the decelerating movement itself, the described sequence of linear functions or juxtaposed linear portions with stepwise decreasing pitch, that is to say stepwise decreasing constant feed rate, is obtained in the individual decelerating steps $S_i$, for example $S_1$ to $S_{10}$.

Before a withdrawal or reversing movement is initiated, an intermediate step can optionally be carried out, for example a cleaning process. It is here possible, for example, to remove chip root residues by rotating the tool further or to clean the peripheral groove of residues of the thread tips, in order to obtain a cleaner cylindrical region. A screw can then be screwed in even better.

After the reversal point UP has been reached, a reversing movement or backwards movement RB is initiated in an embodiment, as shown in particular in FIG. 3 and FIG. 5, in which a first reversing phase first comprises an accelerating movement BB until feeding into the flight 50 is obtained, and in a second reversing phase comprises a backwards movement RB in which the tool 2 is fed outwards in a synchronized manner through the flight 50.

In an advantageous embodiment, the control curve or function according to FIG. 3 can be used or passed through in the reverse order.

For the backwards movement RB or BB, the rotational movement is reversed from the forwards rotational direction VD to the backwards rotational direction RD, that is to say the rotational angle $\varphi$ starting from $\varphi=\varphi_n$ or $\varphi=\varphi_{10}$ preferably reduces or turns back in the negative direction at the reversal point UP until the starting value $\varphi=0$ is finally achieved again and the tool 2 emerges from the workpiece 6. The dependence or function $T(\varphi)$, which is preferably taken over unchanged, has the result that the penetration depth T becomes smaller in terms of amount as the rotational angle decreases, that is to say decreases from $T=T_n$ or $T=T_{10}$ at the reversal point UP to $T=0$ again at the entry point EP at $\varphi=0$, which is thus at the same time also the exit point. In particular, the first reversing phase corresponds to the second working phase and the second reversing phase corresponds to the first working phase.

In particular, an embodiment for the second working phase as, for example, according to FIG. 4 can also be used in the reverse order for the first reversing phase.

FIG. 5 shows an exemplary embodiment showing how, in the first reversing phase, starting from the reversal point UP, the same dependence or function $T(\varphi)$ can be used in the opposite order for the acceleration movement BB in a reversal of the decelerating movement AB, for example according to FIGS. 3 and 4.

However, functions $T(\varphi)$ and sub-steps other than in FIG. 5 can be used, which preferably lead back to the point $(\varphi_0, T_0)$ at which the decelerating movement AB also began or the first working phase ended, so that the correct insertion point for the tool for reversing through the flight 50 can be reached.

Preferably, in the reverse order starting from the end angle value $\varphi_n$ or $\varphi_{10}$, an acceleration phase is first carried out as the first reversing phase with an acceleration movement BB with the same incremental steps. However, these steps are now acceleration steps $S_j$ with $n+1 \leq j \leq 2n$, starting in FIG. 5 with $S_{11}$ to $S_{20}$ for $n=10$.

Each of these acceleration steps $S_j$ has an associated rotational angle interval $[\varphi_{10}, \varphi_{11}], [\varphi_{11}, \varphi_{12}], \ldots, [\varphi_{j-1}, \varphi_j], [\varphi_j, \varphi_{j+1}], \ldots, [\varphi_{19}, \varphi_{20}]$, wherein $\varphi_j$ from the first reversing phase simply corresponds to $\varphi_i$ from the second working phase, if $i+j=n$ is taken. The pitch parameters likewise remain the same, only in the reverse order, that is to say in FIG. 5 they pass from right to left from $P_{10}$ through $P_9$, $P_8$ to $P_1$ for the sub-portions of the control curve according to FIG. 4, until the depth value $T_0$ is reached. According to FIG. 5, the new angle value $\varphi_{11}$ is assumed temporally after the angle value $\varphi_{10}$ and the interval $[\varphi_{10}, \varphi_{11}]$ corresponds to the interval $[T_{10}, T_9]$, with the thread pitch $P_{10}$ and the subsequent angle interval $[\varphi_{11}, \varphi_{12}]$ corresponds to the penetration depth interval $[T_9, T_8]$ with the corresponding thread pitch $P_9$, etc. until the last sub-portion of $[\varphi_{19}, \varphi_{20}]$ corresponding to $[T_1, T_0]$ with the thread pitch $P_1$.

Thereafter, the linear portion of the curve from $\varphi_0$ to $\varphi=0$ corresponding to the penetration depth T from $T_0$ to $T=0$ is passed through in the reverse direction of FIG. 3. The axial feed rate in the backwards movement corresponding to the pitch of the straight line in FIG. 3 is now $P/360°$ again with the reverse direction. As a result, the tool is guided in the opposite direction through the thread formed in the forwards movement, without the flight which has been produced being damaged in the thread. The backwards movement is thus synchronized exactly like the forwards movement, only with the opposite rotational direction, so that the angle $\varphi$ decreases backwards in its value from the angle $\varphi_n$ to $\varphi=0$ and also, with the reverse axial feed rate, the thread depth now increases, from a mathematical point of view, from $T=T_0$ to $T=0$.

Using the same control curve or function $T(\varphi)$ as in the forwards movement VB in the two working phases also in the backwards movement RB in the two reversing phases has the advantage on the one hand that the tool 2 can be controlled with accurate positioning or accurate movement and is in the correct position in particular on feeding into the flight 50, and the forces on reversing can thus be kept very low and/or a high return or withdrawal speed is made possible.

In one embodiment of the implementation of the described dependencies or functions for $T(\varphi)$, the values of the penetration depth T are used as measured input parameters or input parameters specified by the control system or programming, and the associated values of the rotational angle $\varphi$ are obtained from the dependence by means of the associated pitch parameters P and $P_i$.

It is thus possible to choose a CNC program for thread drilling or thread furrowing, in particular with a G33, in particular G331 and G332, path condition with the thread pitch to be inputted, and a sequence or amount of values for the penetration depth can be given, at which a switch to a new thread pitch parameter takes place, wherein the thread pitch parameter is retained until the next value of the penetration depth.

A sequence would be, for example

Working Movement:
At penetration depth T=0 choose thread pitch parameter P and retain it until $T=T_0$. A speed or rotational speed is set.
At $T=T_0$ change to thread pitch parameter $P_1$ and retain it until $T=T_1$.
At $T=T_i$ change to thread pitch parameter $P_{i+1}$ and retain it until $T=T_{i+1}$ for all i with $1 \le i \le n$.
Reduce the rotational speed or speed to 0 at $T=T_n$.

and preferably for the

Reversing Movement:
At $T=T_n$ reverse the axial feed movement and the rotational movement with a set speed or rotational speed and start again in the respective reverse direction with thread pitch parameter $P_n$ and retain this until $T=T_{n-1}$.
At $T=T_j$ change to thread pitch parameter $P_j$ and retain it until $T=T_{j-1}$ for all j as descending index with $1 \le j \le n-1$.
At $T=T_0$ choose thread pitch parameter P and retain it until $T=0$.

Although this embodiment of the working movement in the second working phase and/or reversing movement in the first reversing phase, which in particular corresponds to a linear interpolation, has advantages in existing machine programs on account of its simple implementation, it is possible according to the invention, in all the embodiments, also to provide different dependencies or functions or interpolations in individual sub-steps or subintervals for the relationship between T and φ or also combinations thereof.

In the described linear interpolation, in particular according to FIGS. 4 and 5, the linear curve portions or graph portions are continuously juxtaposed, that is to say the starting points ($φ_i$, $T_i$) of each interval correspond to the end points of the preceding interval and at the first interval correspond to the end point ($φ_0$, $T_0$) of the linear graph of the thread formation. These linking points are also referred to as nodes.

In all embodiments or interpolations, it is possible to choose instead of linear portions also curve portions or graph portions which are continuously differentiably juxtaposed (or: linked, connected together). This means that not only does the starting point of each interval coincide with the end point of the preceding interval, that is to say there is a continuous transition at the linking points between the intervals, but, in addition, the graph portions or the functions thereof are also differentiable in those linking points and their derivatives have the same value. As a result, smooth or continuously differentiable transitions are achieved between the graphs in the individual decelerating steps or intervals, which is advantageous for the movement sequence. The transition at rotational angle $φ_0$ from the thread forming movement in the first working phase to the decelerating movement AB in the second working phase or then correspondingly preferably also from the first reversing phase to the second reversing phase is preferably continuously differentiable or chosen with the same pitch.

Examples of functions which are suitable for such continuously differentiable interpolations are polynomials having a degree higher than 1, in particular third degree polynomials such as, for example, cubic splines.

A spline interpolation can be used here. By means of a third degree polynomial function as spline function $$T(φ)=a_3φ^3+a_2φ^2+a_1φ+a_0$$

with the boundary conditions conventional in polynomials it is possible, for example, to generate a function which is continuous into the third derivative.

Furthermore, a continuous, in particular strictly monotonic or also monotonic decreasing function can also be used for the decelerating operation or at least a predominant part of the decelerating steps $S_i$, for example an exponential function or logarithmic function.

In a further embodiment of an implementation of the described dependencies or functions for T(φ), the values of the rotational angle φ are used as measured input parameters or input parameters defined by the control system or programming, and the associated values of the penetration depth T are obtained from the dependence by means of the pitch parameters P and $P_i$.

In a third variant, the time can also be defined as the input parameter, and the values of the rotational angle φ(t) and of the penetration depth T(t) are obtained from the dependence on the time t and the mutual dependence by means of the pitch parameters P and $P_i$.

In one embodiment, the control or synchronization can take place in an open regulating or control circuit without measuring the process parameters penetration depth and rotational angle. A penetration depth value is thereby allocated to each rotational angle value by means of a value table or by calculation according to the stored formulae, and the rotary drive and axial drive are controlled accordingly.

In a further embodiment, a measurement of at least one of the two process parameters penetration depth and rotational angle can be made, and the measured values can be fed back into the control system in order to realize a control, according to the nominal curve shown in FIGS. 1 to 3, in a closed regulating circuit. The rotational angle φ is generally determined in the region of the drive, in particular the drive spindle, by means of rotation sensors or measurement of physical parameters which are in a definite relationship with the rotational angle. However, it is in principle also possible to measure the rotational angle directly at the tool 2.

The penetration depth T can be measured by axial position sensors, here too generally at the drive, in particular the drive spindle, or also, in a particular embodiment, at the tool or workpiece itself.

In further embodiments, an equalization step or constant circumferential step can additionally take place in the second working phase, during which the penetration depth T(φ)=const. or at least no further feed movement in the forwards direction is carried out. The rotational direction of the rotational movement preferably remains the same during the equalization step, that is to say is not reversed.

Such embodiments will be explained hereinbelow by means of exemplary embodiments and FIG. 6 and FIG. 7.

Figure 6:
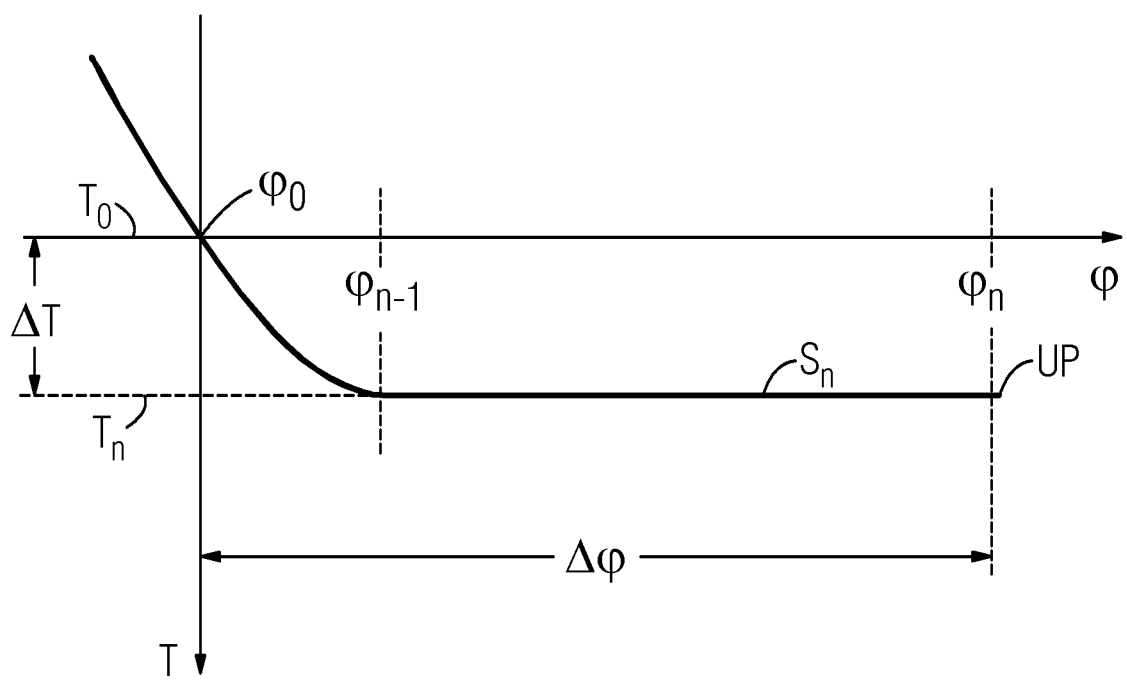

In one embodiment, for example according to FIG. 6, when the maximum penetration depth ΔT is reached at a rotational angle $φ_{n-1}$, the corresponding value T(φ) for the subsequent step $S_n$ is kept constant to the rotational angle $φ_n$ at the reversal point UP, that is to say $T(φ_{n-1})=T_{n-1}=T_n=T(φ_n)$.

Figure 7:
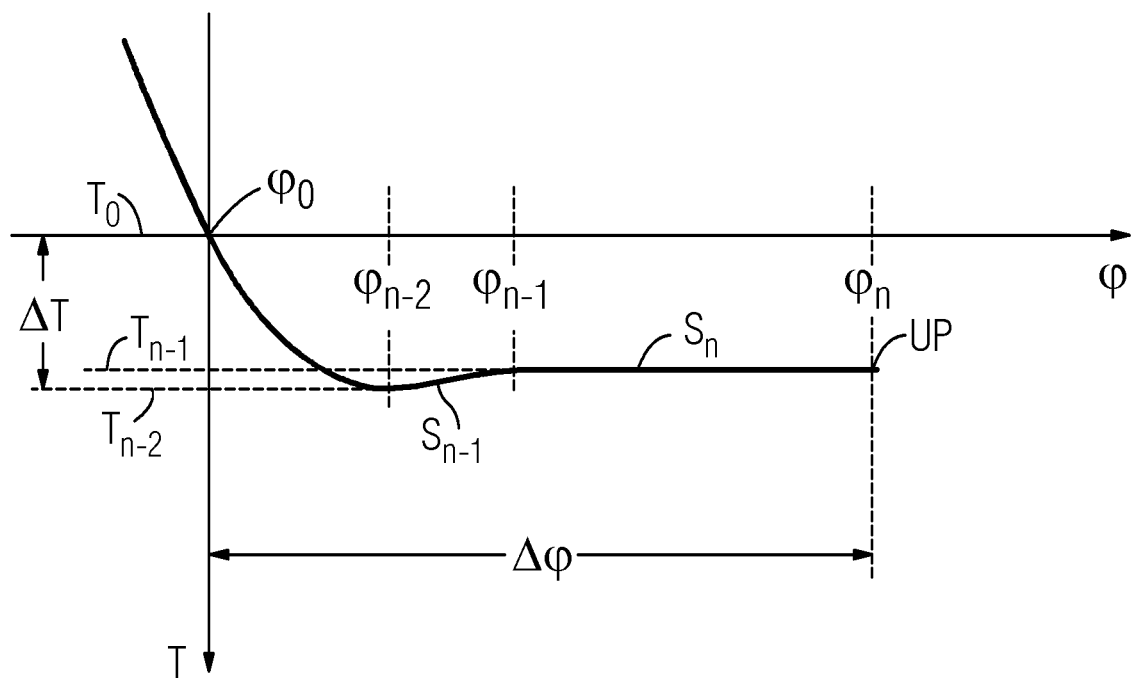

In a further embodiment, for example according to FIG. 7, the maximum penetration depth ΔT is already reached at a rotational angle $φ_{n-2}$ with the corresponding value $T(φ_{n-2})=T_{n-2}$. The value T(φ) for the following step $S_{n-1}$ is then reduced again to the rotational angle $φ_{n-1}$, that is to say the axial feed direction is reversed, and the penetration depth is reduced to the value $T(φ_{n-1})=T_{n-1}<T_{n-2}$. In FIG. 7, this reduction is comparatively small. The tool thus runs with a slight reversing feed in the circumferential groove. This defined movement in the negative T direction away from the hole bottom can be advantageous for further improving the undercut or the peripheral groove in respect of its ability to be screwed through. In FIG. 7 too, from rotational angle $\varphi_{n-1}$, the corresponding value $T(\varphi)$ for the subsequent step $S_n$ is kept constant to the rotational angle $\varphi_n$ at the reversal point UP, that is to say $T(\varphi_{n-1})=T_{n-1}=T_n=T(\varphi_n)$. However, especially when the peripheral groove has already (largely) been produced, a relatively large and/or fast return movement and/or also an axial to and fro movement of the tool can also take place during the equalization, which can also have an axial feed per 360° which is even greater than the thread pitch P.

The tool and its thread teeth thus rotate in step $S_n$ on a circular path or cylindrical path outwards in the workpiece again by a small amount without pitch or even, in step $S_{n-1}$, with a positive pitch.

This movement serves in particular to equalize the peripheral groove and clean the surface of the workpiece, to evacuate chip material as completely as possible from the threaded bore which has been produced, and optionally also to eliminate tension between the workpiece and the tool which built up previously as a result of the machining forces. Step $S_n$ as the last step of the decelerating movement AB in FIGS. 6 and 7 and also the penultimate step $S_{n-1}$ according to FIG. 7 can thus also be referred to as an equalization step.

The overall rotational angle $\varphi_n-\varphi_{n-1}$ of the equalization step $S_n$ in FIG. 6, or $\varphi_n-\varphi_{n-2}$ of the equalization step $S_n$ and $S_{n-1}$ in FIG. 7, can be chosen freely within wide limits, for example between 180° and 2000°, and will generally be chosen to be greater, for example 3 times greater, than the rotational angle $\varphi_{n-1}-\varphi_0$ in FIG. 6, or $\varphi_{n-2}-\varphi_0$ in FIG. 7, of the previous monotonic descending portion (transition region).

In the reversing movement RB, the equalization step, for example, according to FIG. 6 or 7 can also be omitted wholly or in part in the first reversing phase.

As a result of the measures according to the invention, advantageous movement sequences can be achieved in the transition to the undercut (peripheral groove) as well as in the undercut itself. The working speed of the tool can be as high and as consistent (constant) as possible. The machine (including control system) can reproduce the movement highly dynamically. Moreover, a geometry which can be screwed through can be produced in the undercut or the peripheral groove.

If the conditions at the machine are considered, it will be seen that a mass inertia in the system and also an inertia in the drives and in the control system are physically present. In order to keep the speed from the thread high also in the undercut, that is to say the peripheral groove, a constant movement path of the Z-axis (variable T) and the rotational axis (variable $\varphi$) in particular make it possible for the machine to perform that movement, preferably with a high path speed. This then results in a high and constant speed of the effective tool teeth and cutters. This is in turn advantageous for uniform chip removal.

In order to program the machine, the theoretical movement paths can be converted into corresponding NC blocks. Slight deviations or approximations (in the form of, for example, compound helix movements) can thereby occur.

Figure 8:
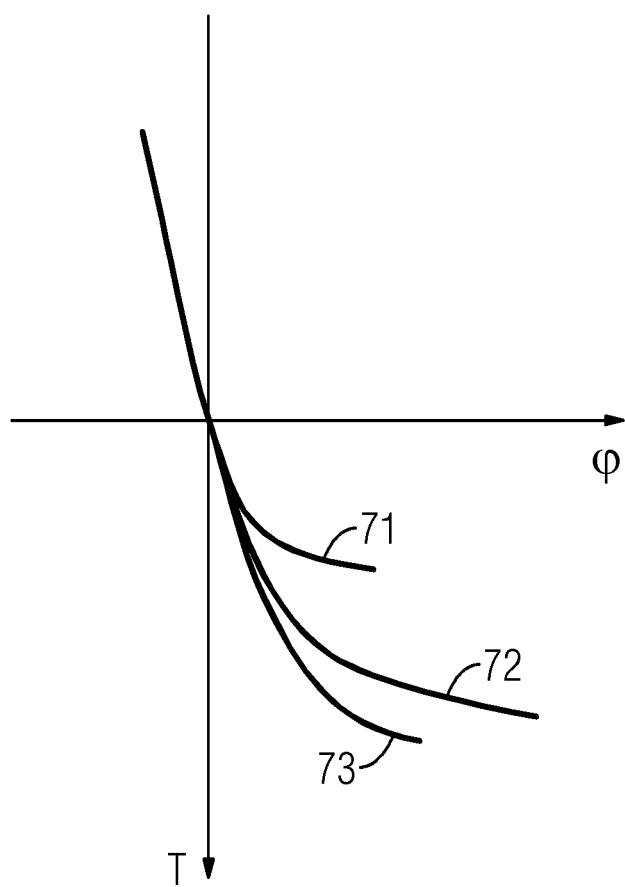
Figure 9:
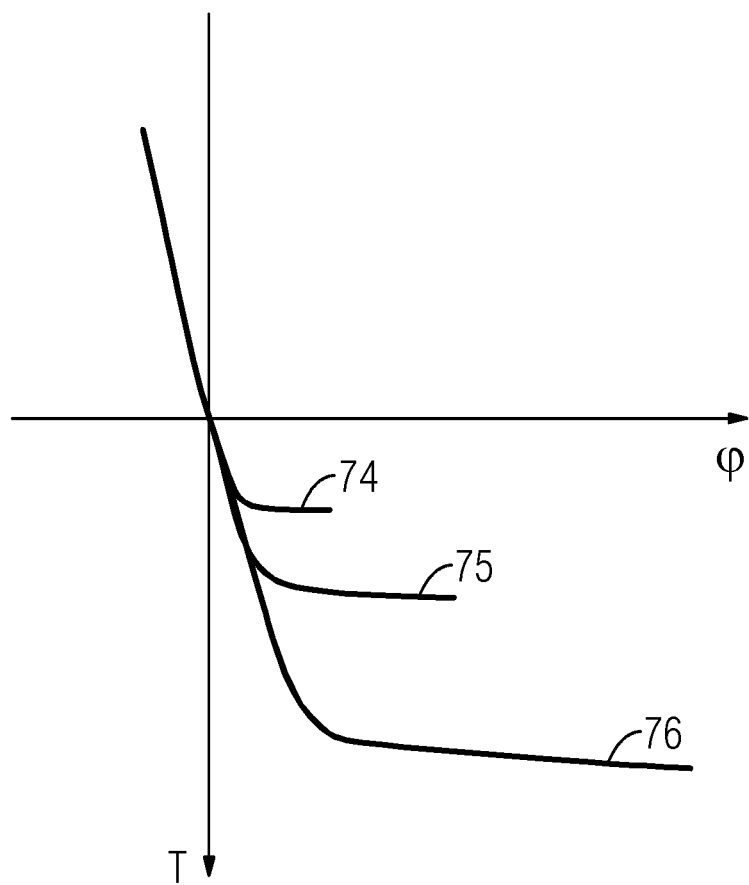
Figure 10:
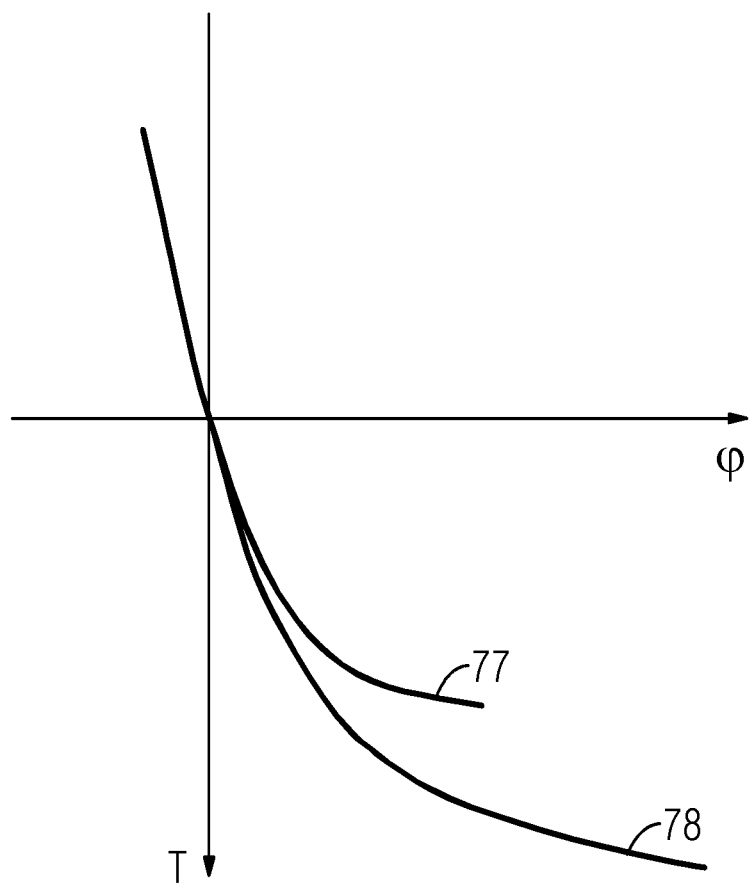

FIGS. 8 to 10 show exemplary embodiments in a diagram in which the penetration depth T is again plotted over the rotational angle $\varphi$ for the second working phase (and optionally the first reversing phase).

FIG. 8 shows three exemplary embodiments with graphs or curves 71 to 73, in which a constant drilling depth per pitch, as in the example of FIG. 4, is chosen for three different values.

FIG. 9 shows three exemplary embodiments with graphs or curves 74 to 76, in which a constant rotational angle per pitch is chosen for three different values.

FIG. 10 shows an exemplary embodiment with a graph or a curve 77 which corresponds to an exponential function, for example according to $$T = -e^{\frac{-P}{\pi \cdot fd}x} + 1;$$

wherein fd is the flank diameter and x is a consecutive natural number.

FIG. 10 further shows an exemplary embodiment with a graph or a curve 78 which has been produced by means of a cubic spline function.

The described theoretical curves or functions can be reproduced in particular by a corresponding number of individual NC control data blocks.

FIG. 11 shows an exemplary embodiment of the temporal dependence or control of the rotational angle $\varphi=\varphi(t)$ as a function of time t over the entire cycle between the entry point EP and the reversal point UP and back again. The penetration depth $T(\varphi(t))$ is obtained as a function of the time t on the basis of the chosen dependence $T(\varphi)$, which in the exemplary embodiment shown corresponds to a linear interpolation as in FIG. 4, but can naturally also follow a different dependence as described hereinbefore.

LIST OF REFERENCE SIGNS

2 Tool
3 Drilling region
4 Thread generating region
5 Threaded hole
6 Workpiece
20 Working region
21 Shank
30, 31 Main drilling cutters
41 First thread tooth
42 Second thread tooth
50 Flight
51, 52, 53 Groove
55 Thread profile
60 Workpiece surface
71, 72, 73 Graph
74, 75, 76 Graph
77, 78 Graph
a Groove length
A Tool axis
AB Decelerating movement
b Thread gap
BB Acceleration movement
c Thread profile width
d Core hole diameter
D Threaded hole diameter
E, E1, E2 Transverse plane
M Thread center axis
P Thread pitch
$P_1$ to $P_{10}$ Pitch parameter
$S_1$ to $S_{10}$ Decelerating step
$S_{11}$ to $S_{20}$ Acceleration step
T Penetration depth
$T_G$ Thread depth
$T_L$ Threaded hole depth
$T_0$ to $T_{10}$ Depth value
$T_i$, $T_n$ Depth value ΔT Penetration depth range
UP Reversal point
VB Forwards movement
RB Backwards movement
φ Cumulative rotational angle
Δφ Rotational angle range
$φ_0$ to $φ_{20}$ Rotational angle value
$φ_i$, $φ_n$ Rotational angle value
δ Thread pitch angle

We claim:

1. A method for forming an internal thread with a predefined thread pitch and with a predefined thread profile in a workpiece, wherein:
    a) a tool is used, which is rotatable about a tool axis extending through the tool and is movable axially relative to the tool axis and which comprises a thread generating region;
    b) the thread generating region has at least one thread tooth, which is adapted and arranged to the predefined thread pitch and comprises an active profile, which corresponds to the thread profile of the thread; and
    c) the tool is moved in a working movement into the workpiece or to the workpiece in a working direction during a first working phase,
    wherein:
    d) the working movement comprises a rotational movement in a predefined rotational direction about the tool axis and, synchronized with the rotational movement according to the thread pitch, an axial feed movement in an axial forwards direction axially relative to the tool axis, in such a manner that a complete revolution of the tool about the tool axis corresponds to an axial feed of the tool by the predefined thread pitch;
    e) during the working movement, the thread generating region forms the thread;
    f) the tool, in a decelerating movement following the working movement, is moved during a second working phase further into the workpiece in the same forwards direction as in the working movement, as far as a reversal point;
    g) the decelerating movement comprises a rotational movement in the same rotational direction as in the working movement;
    h) during the decelerating movement, the axial feed movement is controlled in dependence on a rotational angle of the rotational movement of the tool according to a previously stored definite relationship between the axial feed of the tool and the rotational angle;
    i) the axial feed of the tool during a complete revolution, is smaller in terms of amount than the thread pitch at least during part of the decelerating movement and is zero at the reversal point;
    j) during the decelerating movement, mutually different functions between the axial feed of the tool and the rotational angle are set in multiple decelerating steps; and
    k) during the multiple decelerating steps, the axial feed is a linear function of the rotational angle and the pitch, that is to say the derivative of the axial feed with respect to the rotational angle, is constant in each of those decelerating steps, and decreases in terms of amount from one decelerating step to a following decelerating step.

2. The method as claimed in claim 1, wherein:
    a rotational speed of the rotational movement at the reversal point is zero.

3. The method as claimed in claim 1, wherein:
    there is used for the working movement an NC control system for a threading process; and
    in the multiple decelerating steps there is likewise used the NC control system used for the working movement for a threading process.

4. The method of claim 3, wherein the NC control system utilizes a G33 path condition with the predefined thread pitch being used as an interpolation parameter.

5. The method as claimed in claim 1, wherein:
    during multiple decelerating steps, the axial feed is a cubic spline function of the rotational angle.

6. The method as claimed in claim 1, wherein:
    the different functions of successive decelerating steps are continuously juxtaposed and, in the case of differentiable functions, continuously differentiably juxtaposed.

7. The method as claimed in claim 1, wherein during an equalization step, the axial feed during the decelerating movement is zero in a rotation angle sub-interval.

8. The method as claimed in claim 1, wherein:
    after the reversal point has been reached, a reversing movement of the tool is initiated, with which the tool is moved out of the workpiece;
    the reversing movement comprises:
        first a first reversing phase, with which the thread generating region of the tool is guided back into a flight of the formed thread; and,
        thereafter, a second reversing phase, during which the thread generating region is guided outwards out of the workpiece through the flight.

9. The method as claimed in claim 8, wherein:
    the reversing movement in the first reversing phase is controlled by the previously stored definite relationship, which is the same in terms of amount but inverted in the rotational direction and feed direction between the axial feed of the tool and the rotational angle, as in the decelerating movement during the second working phase, with omission or shortening of an equalization step, where present.

10. The method as claimed in claim 1,
    a) in which a tool is used, which is rotatable about a tool axis running through the tool and movable axially to the tool axis and which has a drilling region at a front or free end and a thread generating region which is arranged axially offset to the tool axis relative to the drilling region and protrudes radially further outwards relative to the tool axis than does the drilling region; and
    b) wherein, during the working movement, the drilling region of the tool produces a core hole in the workpiece and the thread generating region produces a flight, extending with the predefined thread pitch, in the inner wall of the core hole produced by the drilling region.

11. The method of claim 1, wherein during the decelerating movement in the second working phase, a circumferential groove is produced in the workpiece.

12. The method of claim 1, wherein an overall or cumulative axial feed of the tool during the decelerating movement is chosen to be between 0.1 times and 2 times the thread pitch.

13. The method of claim 1, wherein during an equalization step, the axial feed during the decelerating movement takes place in a rotational angle sub-interval in a backwards direction opposite to the forwards direction of the working movement.

* * * * *